United States Patent [19]

Evans et al.

[11] Patent Number: 5,794,017
[45] Date of Patent: Aug. 11, 1998

[54] METHOD AND SYSTEM OF UPDATING GRAPHICS MEMORY IN A GRAPHICS DISPLAY SYSTEM THROUGH MULTIPLE ADDRESS TRANSFERRING OF PIXEL DATA

[75] Inventors: Edward Kelley Evans; Daniel Joseph Liguori, both of Essex Junction; Roderick Michael Peters West, Colchester, all of Vt.

[73] Assignee: International Business Machines Corporation, Armonk, N.Y.

[21] Appl. No.: 384,077

[22] Filed: Feb. 6, 1995

[51] Int. Cl.$^6$ ............................................ G06T 1/60
[52] U.S. Cl. ................... 395/507; 395/526; 395/501; 395/515; 345/189; 345/190; 345/213
[58] Field of Search ........................... 395/162–166, 395/140–141, 526, 507, 501, 509, 515, 517; 345/24, 27–28, 133, 185–187, 189–190, 200, 201, 213

[56] References Cited

U.S. PATENT DOCUMENTS 5,398,316  3/1995  Guttag et al. ..................... 395/164

*Primary Examiner*—Kee M. Tung
*Attorney, Agent, or Firm*—James M. Leas; Andrew J. Dillon

[57] ABSTRACT

The graphics display system comprises a data bus for transferring a set of application pixels, wherein a set consists of W number of blocks of data, and wherein each application pixel is M number of blocks. The graphics display system further comprises an address bus for transferring memory addresses, a graphics controller for outputting pixel data on the data bus at a rate of one set per memory clock cycle and for outputting one or more column addresses on the address bus for each set, and a graphics memory configured for a memory field size of N number of blocks such that an application pixel being stored is allocated N blocks. A set of application pixels is transferred over the data bus to the graphics memory, and, one or more column addresses are transferred over the address bus during the a memory clock cycle over the address bus. In addition, a row address is transferred to the graphics memory. Each block of the transferred set belongs to one of N/M groups of blocks, and each of these blocks are stored in the graphics memory in a memory field indicated by a transferred row and column address pair, wherein each group of blocks is stored at a different one of N/M number of column addresses for any given transferred set.

44 Claims, 8 Drawing Sheets

| A(8:0) | 01F | 000 | 001 | 002 | 003 | 004 | 005 |
|---|---|---|---|---|---|---|---|
| D(63:56) | | P03 16H | P07 16H | P0B 16H | P0F 16H | P13 16H | P17 16H |
| D(55:48) | | P03 16L | P07 16L | P0B 16L | P0F 16L | P13 16L | P17 16L |
| D(47:40) | | P02 16H | P06 16H | P0A 16H | P0E 16H | P12 16H | P16 16H |
| D(39:32) | | P02 16L | P06 16L | P0A 16L | P0E 16L | P12 16L | P16 16L |
| D(31:24) | | P01 16H | P05 16H | P09 16H | P0D 16H | P11 16H | P15 16H |
| D(23:16) | | P01 16L | P05 16L | P09 16L | P0D 16L | P11 16L | P15 16L |
| D(15:8) | | P00 16H | P04 16H | P08 16H | P0C 16H | P10 16H | P14 16H |
| D(7:0) | | P00 16L | P04 16L | P08 16L | P0C 16L | P10 16L | P14 16L |

*Fig. 2A*
Prior Art

| A(8:0) | 01F | 006 | 007 | 008 | 009 | 00A | 00B |
|---|---|---|---|---|---|---|---|
| D(63:56) | | — | — | — | — | — | — |
| D(55:48) | | P1B 8 | P1F 8 | P23 8 | P27 8 | P2B 8 | P2F 8 |
| D(47:40) | | — | — | — | — | — | — |
| D(39:32) | | P1A 8 | P1E 8 | P22 8 | P26 8 | P2A 8 | P2E 8 |
| D(31:24) | | — | — | — | — | — | — |
| D(23:16) | | P19 8 | P1D 8 | P21 8 | P25 8 | P29 8 | P2D 8 |
| D(15:8) | | — | — | — | — | — | — |
| D(7:0) | | P18 8 | P1C 8 | P20 8 | P24 8 | P28 8 | P2C 8 |

*Fig. 2B*
Prior Art

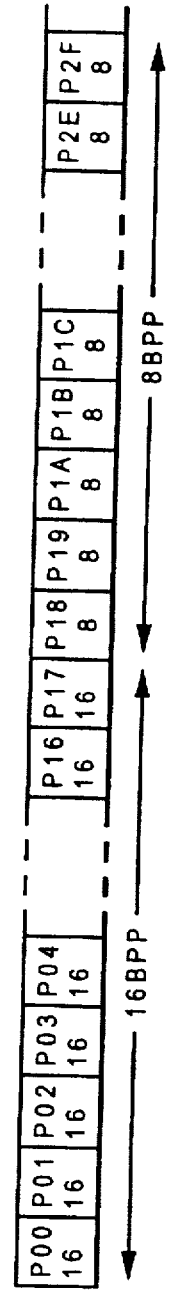

METHOD AND SYSTEM OF UPDATING GRAPHICS MEMORY IN A GRAPHICS DISPLAY SYSTEM THROUGH MULTIPLE ADDRESS TRANSFERRING OF PIXEL DATA

BACKGROUND OF THE INVENTION

1. Technical Field

The present invention relates in general to graphics display systems, and in particular to computer graphics display systems. Still more particularly, the present invention relates to a graphics subsystem for updating the graphics memory in a graphics display system.

2. Description of the Related Art

In the field of Computer Graphics, many different types of graphical data and applications may be presented simultaneously on the computer display. The different graphical applications potentially have different requirements for the number of bits per pixel (and therefore colors) needed to display their graphical data. For instance, MultiMedia™ or Natural Image™ applications would be advantageously displayed using 16 or 24-bits per pixel (65K or 16M colors, respectively), whereas spreadsheet or word processor applications would be satisfactory with 8-bits per pixel (256 colors). With conventional techniques, applications utilizing 8-bits per pixel will only obtain half the memory bandwidth available to applications utilizing 16-bits per pixel (and so forth, pro-rated) when the graphics memory is configured for applications using 16-bits per pixel. Thus, for example, if a computer was displaying two images, the first being displayed by a multi-media application showing a video image of a brightly colored balloon, at 16-bits per pixel, and the second being displayed by a word processing application, showing a text document at 8-bits per pixel, the graphics subsystem updating the video display would be configured for a 16-bit per pixel size to support the multi-media application's display of the balloon. This reduces by half the available memory bandwidth for updating the word processing application. The result is that the dynamic display of the word processing application is slowed down, perhaps to a level perceptible by the computer user. For example, if a user flips to the next page of the word processing document, what might seem an instantaneous update of the display if only the word processing document was being displayed, may take a perceptible amount of time to update with both images being displayed.

The problem becomes amplified when additional graphical applications are displayed that have even greater requirements for the number of bits per pixel needed to display their graphical data. For example, if a computer graphics display is simultaneously displaying three applications, one requiring 30-bits per pixel, a second requiring 16-bits per pixel, and a third requiring 8-bits per pixel, the graphics memory subsystem would be configured for displaying graphical applications of 30-bits per pixel. The 16-bit per pixel application would utilize only half the available memory bandwidth and the 8-bit per pixel application would utilize only a quarter of the memory bandwidth.

As can be seen, conventional graphical display systems dramatically degrade the performance of lower bit per pixel applications when simultaneously displaying multiple applications that utilize different numbers of bits per pixel. It would be highly desirable to provide the fullest possible memory bandwidth to all displayed applications irrespective of the number of bits per pixel used.

SUMMARY OF THE INVENTION

According to the present invention, a method and system is provided for updating graphics memory in a graphics display system through multiple address transferring of pixel data. The graphics display system comprises a data bus for transferring a set of application pixels, wherein a set consists of W number of blocks of data, and wherein each application pixel is M number of blocks. The graphics display system further comprises an address bus for transferring memory addresses, a graphics controller for outputting pixel data on the data bus at a rate of one set per memory clock cycle and for outputting one or more column addresses on the address bus for each set, and a graphics memory configured for a memory field size of N number of blocks such that an application pixel being stored is allocated N blocks. A set of application pixels is transferred over the data bus to the graphics memory, and one or more column addresses are transferred over the address bus during a memory clock cycle. In addition, a row address is transferred to the graphics memory over the address bus. Each block of the transferred set belongs to one of N/M groups of blocks, and each of these blocks are stored in the graphics memory in a memory field indicated by a transferred row and column address pair, wherein each group of blocks is stored at a different one of N/M number of column addresses for any given transferred set.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 2A illustrates an example of the update and data sequence for a 16-bit per pixel data type in a prior art graphical display system.

FIG. 2B illustrates an example of the update and data sequence for an 8-bit per pixel application type in a prior art graphical display system.

FIG. 2C depicts a diagrammatical representation of the storage of pixel data in graphics memory, and of the serial data output sequence, for the example of FIG. 1.

FIG. 2D depicts the Display Data Sequence output by a DAC for the example of FIG. 1.

FIG. 5 diagrammatically shows the alternating sequences of Normal and Reverse byte ordering of a pixel data update, according to a preferred embodiment of the present invention.

FIG. 6 diagrammatically shows the configuration of graphics memory containing multiple application pixels having different bits per pixel, according to an example of a preferred embodiment of the present invention.

DETAILED DESCRIPTION OF THE PREFERRED EMBODIMENT

Figure 1:
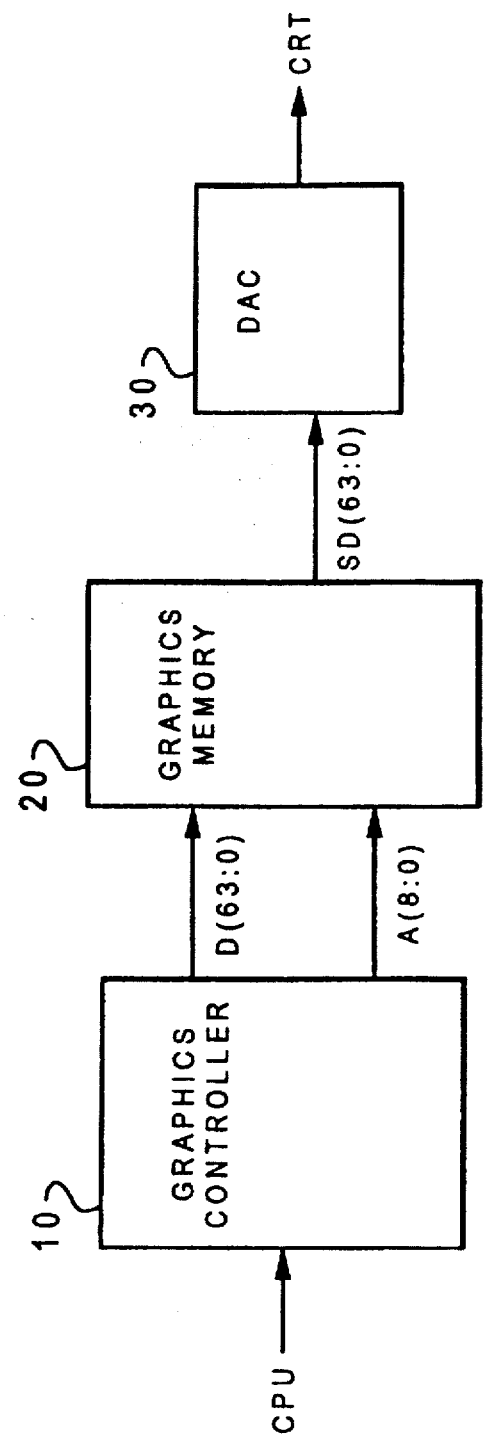
FIG. 1 depicts a block diagram of a prior art graphics display system in accordance with a preferred embodiment of the present invention.

Referring now to the figures, and in particular to FIG. 1, there is depicted a block diagram of a conventional graphics display system as used in the prior art. The graphics display system includes graphics controller 10, graphics memory 20, and digital-to-analog converter (DAC) 30. Graphics controller 10 receives information from a central processing unit (CPU) to be displayed on a CRT display. Graphics controller 10 transmits pixel data over a 64-bit data bus (D(63:0)) to update the graphics memory 20. Graphics controller 10 also provides row and column address information on a 9-bit address bus (A(8:0)), and a set of control signals (not shown) including a Row Access Strobe (RAS), a Column Access Strobe (CAS), an Output Enable, and a number of Write Enables. Graphic memory 20 provides serial pixel data on a 64-bit serial data bus connected to the 64-bit serial data input (SD(63:0)) of DAC 30. The DAC 30 processes the received digital data and converts it into analog signals that drive the attached display device (usually a CRT).

When different pixel sizes are handled simultaneously by a graphics display system, the type and size of each pixel is determined either by the graphics system algorithmically, or from attribute information within the pixel data, or from a separate pixel attribute data channel. In such graphical environments, the graphics display system is configured to support the maximum number of bits that can be allocated to any type of display pixel. For instance, where N-bit per pixel applications are to be presented with applications of less than N-bits per pixel, the graphics display system is configured to allocate N-bits for every displayable pixel. For an application of M-bits per pixel (M<N), M of the available N-bits are used for each pixel of that application, with the remaining N-M bits being left unused. When more than one layer of display data is available, such as in the case with an overlay layer or with double- or quad-buffering, then the number of bits (N) allocated for each pixel will generally be the sum of the maximum number of bits required for applications in each layer. The concept of overlays, double- or quad-buffering and their applicability to the present invention will not be specifically discussed herein, but can be readily inferred by those skilled in the art. In such cases, with multiple layers of pixel data, applications operating in each layer may be considered precisely as applications utilizing less than N-bits per pixel.

Generally, in a graphics display system such as FIG. 1, the width (W) of the data bus (64-bit for FIG. 1) used to update the graphics memory is a multiple of the number of bits (N) allocated for each display pixel. The graphics memory 20 has the conventional arrangement of row and column addresses, and in a single write/update cycle, the data of a width W updates W-bits of the graphics memory 20 at a single specified row/column address pair. Thus, in a single write/update cycle, W/N pixels are updated. If the data bus can be operated at a maximum frequency F, then the update bandwidth of the graphics display system is F*W bits per second, allowing an update rate of F*W/N pixels per second. For example, in a single clock cycle, a 64-bit data bus can update a consecutive group of 8 pixels for N=8 (8-bit pixels), or 4 pixels for N=16 (16-bit pixels), or 2 pixels for N=32 (32-bit pixels). A 64-bit data bus operating at 25 MHz has a peak update bandwidth of 200 MegaBytes per second, allowing an update rate of 200 million pixels per second for N=8 (8-bit pixels), or 100 million pixels per second for N=16 (16-bit pixels), or 50 million pixels per second for N=32 (32-bit pixels), and so on.

In such a graphics display system, the number of bits (N) allocated in the graphics memory for each displayable pixel determines the update rate in terms of number of pixels per second irrespective of the number of bits per pixel (M) utilized by an application. Therefore, applications using M-bits per pixel (where M<N) experience a lower update rate when the configuration is set for N-bits per pixel than they would when the configuration is set for M-bits per pixel. For example, with a 64-bit data bus and the configuration set for N=16 (16-bit pixels), a single cycle can update a consecutive group of 4 pixels. Whether the application data is a full 16-bits per pixel or only 8-bits per pixel, only 4 pixels can be updated in a single cycle. If the configuration had been set for N=8 (disallowing applications of 16-bits per pixel), then 8 pixels of 8-bits per pixel could have been updated in a single cycle. Thus, applications using 8-bits per pixel experience half the update rate with the configuration set for N=16 (16-bit pixels) than they would with the configuration set for N=8 (8-bit pixels).

As used in this specification, the graphics memory is logically subdivided into what are called "memory fields". The graphics memory is configured for a memory field size of N number of blocks. In other words, the number of bits (N) allocated in the graphics memory for each displayable pixel stored in the graphics memory is allocated in fields of the graphics memory. Also, as will be used in the specification, the application data output by the graphics controller is logically divided into what will be called "application pixels". An application pixel is the number of bits per pixel (M) utilized by a particular application.

The 64-bit graphics display system of FIG. 1 is used in a graphical environment that will simultaneously present application pixels using 16-bits per pixel (16 bpp) and application pixels using 8-bits per pixel (8 bpp). Therefore, the configuration is set for N=16 (16-bit memory fields) to accommodate both application pixel types. The data for 16 bpp applications will fully utilize the 2-byte (16-bit) pixel data fields (i.e. the memory field), whereas the data for 8 bpp applications will only utilize the even (lower) of the two bytes available to each pixel. With the configuration set for N=16, the 64-bit data bus width will handle 4 pixels in parallel.

Referring now to FIGS. 2A–2D, there is illustrated an example of the update and data sequences for both pixel data types in the conventional graphical display system shown in FIG. 1. FIG. 2A is an example diagrammatically showing an update for a 16-bit per pixel application that is output on the 64-bit data bus by graphics controller 10, as is performed by prior art graphical display systems. This update of a 16-bit per pixel application uses page-mode to write the first 24 pixels ($P00_{HEX}$–$P17_{HEX}$) of a scan-line (stored at the start of memory row $01F_{HEX}$). At the falling edge of RAS, the row address is obtained from the address bus ($A(8:0)=01F_{HEX}$). At the first falling edge of CAS, the column address is obtained from the address bus ($A(8:0)=000_{HEX}$), providing access to the first 4 pixels ($P00_{HEX}$–$P03_{HEX}$) of the scan-line. At the same falling edge of CAS, the pixel data made available on the data bus is written to the 8 bytes of memory (64bits=4 pixels) at the specified row/column address pair.

The 64-bit data bus is divided into 8 bytes, and each byte is shown in FIG. 2A with a notation describing the data of that byte: 16H indicates the high byte of a 16-bit pixel, and 16L indicates the low byte of a 16-bit pixel. At each subsequent falling edge of CAS, the column addresses are obtained from the address bus (A(8:0)=$001_{HEX}$ ... $005_{HEX}$), providing access to the subsequent 20 16-bit pixels ($P04_{HEX}$–$P17_{HEX}$) of the scan-line in 5 subsequent CAS cycles. At each falling edge of CAS, the pixel data on the 64-bit data bus is written to the 8 bytes at each row/column address pair.

FIG. 2B is an example diagrammatically showing an update of the same graphics memory 20 configured for 16-bit pixel fields or memory fields by the graphics controller 10 for an 8-bit per pixel application, as is performed by prior art graphical display systems. The update for the 8-bit per pixel application uses page-mode to write the next 24 pixels ($P18_{HEX}$–$P2F_{HEX}$) of the same scan-line (stored at memory row $01F_{HEX}$). At the falling edge of RAS, the row address is obtained from the address bus (A(8:0)=$01F_{HEX}$). At each falling edge of CAS, the column addresses are obtained from the address bus (A(8:0)=$006_{HEX}$ ... $00B_{HEX}$), providing access to the 24 8-bit pixels in 6 CAS cycles. At each falling edge of CAS, the even bytes of the 64-bit data bus are used to write the four 8-bit pixels at each row/column address pair. The odd bytes of the data bus are unused, and the odd bytes at each row/column pair are prevented from update under Write Enable control. If marker values in the odd bytes are used to indicate that the pixel data is of the 8-bits per pixel type, then such markers will have been preset to the appropriate values by a previous fill operation using high speed Block or Flash Writes. For the 8-bit per pixel application data, each byte is shown with a notation describing the data of that byte "8" indicates the 8-bit pixel data, and indicates "–" indicates the unused byte of the 16-bit pixel field.

Referring now to FIG. 2C, there is depicted a diagrammatical representation of the storage of pixel data in the graphics memory and of the serial data output sequence for the example of FIG. 2. FIG. 2C graphically shows the storage in graphics memory 20 of row $01F$, columns $000$–$00B$, after being updated by the update cycles shown in the examples of FIGS. 2A and 2B. Since graphics memory 20 has been configured to accommodate 16-bit per pixel applications, the graphics memory has been configured for a memory field size of 2 bytes so that each application pixel being stored in the graphics memory is allocated 2 bytes.

FIG. 2C also shows the Serial Data Sequence for the first 48 pixels of the scan-line when it is output on the Serial Data Bus (SD(63:0)). In the example shown, the Serial Data Sequence begins with the data stored at column address $000_{HEX}$ of the row associated with the scan-line being output. Each subsequent cycle of a serial clock presents data from each subsequent column of that row, $001_{HEX}$, $002_{HEX}$, $003_{HEX}$ ... and so on. Because the Serial Data Bus is 64-bits wide, and the configuration is set for N=16 (16-bit pixels), the display data for 4 pixels is output on every cycle. For the first 6 cycles, the 24 16-bit pixels ($P00_{HEX}$–$P17_{HEX}$), written for the 16-bit application, are output on the Serial Data Bus. For the next 6 cycles, the 24 8-bit pixels ($P18_{HEX}$–$P2F_{HEX}$), written for the 8-bit application, are output on the Serial Data Bus. The DAC 30 receives the display data for 4 pixels in every cycle from the Serial Data Bus (so called 4:1 Multiplexing), at a rate that is one quarter of the display pixel frequency. The DAC 30 processes the received Serial Data one pixel (16-bits) at a time, in the sequence SD(15:0), SD(31:16), SD(47:32), SD(63:48), converting the 4-wide quarter rate pixel data stream into a 1-wide full rate pixel data stream.

FIG. 2D shows the full rate pixel data stream (the Display Data Sequence) that is processed at the display pixel rate and converted to the analog signals used to drive the attached display device. In the example shown, the first 24 pixels ($P00_{HEX}$–$P17_{HEX}$) are understood to be 16-bit pixels and the two bytes of pixel data are processed by the DAC 30 according to the mode and functions specified for such 16-bit pixels. In the example shown, the next 24 pixels ($P18_{HEX}$–$P2F_{HEX}$) are understood to be 8-bit pixels and the even (lower) bytes of pixel data are processed by the DAC 30 according to the mode and functions specified for such 8-bit pixels. Because the data is for 8-bit pixels, the odd (higher) bytes of pixel data are ignored by the Palette DAC 30.

As can readily be seen by this example, prior art graphics display systems substantially degrade the performance of all lower-bit per pixel applications when simultaneously displaying multiple applications having different sized bit per pixel data. In the example, the update rate for the 8-bit per pixel application was provided only half the bandwidth of the data bus because the graphics memory was configured for the 16-bit per pixel application. If the graphics memory had been configured for a 32-bit per pixel application, only two pixels could be updated per clock cycle, given a 64-bit data bus. This would provide only a fourth of the memory bandwidth to an 8-bit per pixel application. It would be highly desirable to provide full memory bandwidth to all displayed applications irrespective of the number of bits per pixel used.

According to the present invention, irrespective of the application pixel size (i.e. number of bits per pixel (M) utilized by an application), the application can utilize the full update bandwidth of the graphics display system. The number of bits per pixel (M) utilized by an application determines the maximum update rate in terms of number of pixels per cycle, irrespective of the number of bits (N) allocated in graphics memory for each displayable pixel. In other words, the number of bits (N) allocated for each displayable pixel does not determine the maximum update rate in terms of the number of pixels per cycle, as is the case with the prior art.

When utilizing the present invention, applications using M bits per pixel (where M<N) experience the same (and full) update rate when the configuration is set for N bits per pixel as they would when the configuration is set for M bits per pixel. For example, with a 64-bit data bus and the configuration set for N=16 (16-bit pixels), a single cycle can update a consecutive group of four 16-bit pixels or eight 8-bit pixels. Whether the application data is a full 16-bits per pixel or only 8-bits per pixel, the application can utilize the full bandwidth available on the 64-bit data bus. Applications using 8-bits per pixel experience the same update rate with the configuration set for N=16 (16-bit pixels) as they would with the configuration set for N=8 (8-bit pixels). Thus, 8-bit pixel applications experience twice the update bandwidth available in a similarly configured conventional graphics display system, and therefore can run at up to twice the conventional speed.

Figure 3:
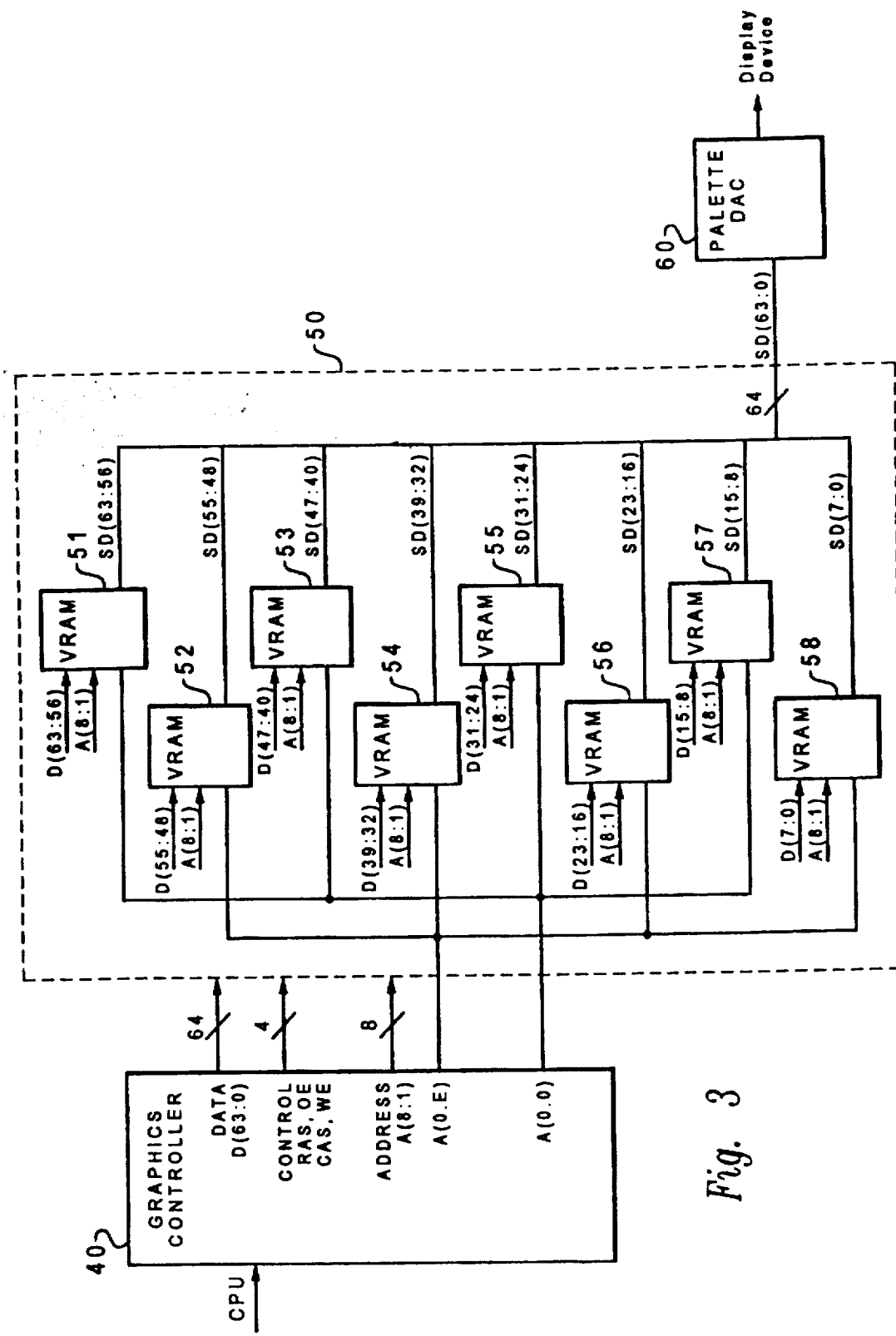
FIG. 3 depicts a schematic block diagram of a graphics display system, according to a preferred embodiment of the present invention.

Referring now to FIG. 3, there is depicted a schematic block diagram of a graphics display system according to a preferred embodiment of the present invention. The graphics display system of the present invention comprises a Graphics Controller 40, a Graphics Memory 50 (also called Frame Buffer memory), and a Palette DAC 60. The Graphics Controller 40 receives display information from a CPU and provides a 64-bit data bus (D(63:0)) to update the Graphics Memory 50. To control the Graphics Memory 50, the Graphics Controller 40 also provides a 9-bit Address bus (A(8:0)), and a set of control signals including a Row Access Strobe (RAS), a Column Access Strobe (CAS), an Output Enable (OE), and a number of Write Enables (WE). The Write Enables provide byte-write control over the bytes of the Frame Buffer memory. Graphics Memory 50 has a size of 2 MegaBytes, and is made up of eight 256K×8 Video RAM (VRAM) devices 51-58. The application of this technique to other sizes and architectures of Frame Buffer memory, and to VRAM devices of different densities (256K×16 or 256K×4 etc.), can be readily inferred by those skilled in the art. Graphics memory 50 provides a 64-bit Serial Data bus connecting to the 64-bit Serial Data input (SD(63:0)) of the Palette DAC 60. Palette DAC 60 receives the Serial Data over the 64-bit Serial Data bus (SD(63:0)), processes the received digital data, and converts this data into the analog signals that drive the attached Display Device (usually a CRT), all in a manner known and understood by those skilled in the art.

As seen in FIG. 3, the least significant address bit A(0) of the conventional 9-bit address bus has been "split" into two signals that are designated A(0.O) and A(0.E) Address signal A(0.O) is used to provide the least significant address bit to the odd bytes of the graphics memory. This can be seen in FIG. 3 where the address signal A(0.O) is being sent to the "odd" group of VRAMs 51, 53, 55, 57. Address signal A(0.E) is used to provide the least significant address bit to the even bytes of the graphics memory. This can be seen in FIG. 3 where address signal A(0.E) is connected to the "even" group of VRAMs 52, 54, 56, 58. The remaining eight higher significant bits of the address A(8:1) are sent to each video RAM 51-58. Also, as shown in FIG. 3, one byte of the 64-bit data bus (D(63:0)) is sent to each of the VRAMs 51-58.

The preferred embodiment of the present invention is a 64-bit graphics display system used in a graphical environment that will simultaneously present applications using 16-bits per pixel and applications using 8-bits per pixel. Therefore, the configuration of Graphics Memory 50 is set for N=16 (16-bit pixels) to accommodate both pixel types. The data for 16-bit per pixel applications will fully utilize the 2-byte (16-bit) pixel data fields allocated for each application pixel, whereas the data for 8-bit per pixel applications will only utilize one of the two bytes available to each application pixel.

The preferred embodiment shown in FIG. 3, and the subsequent data sequences shown in FIG. 4, are primarily optimized for a graphics display system that supports 8-bit and 16-bit per pixel applications with a Serial Data width (SDW) equal to the Data Bus width (DBW). The example shown has been chosen for its simplicity, while also being able to illustrate the concepts of the present invention. It should be understood that the graphics display system of the present invention is not limited to supporting 8-bit and 16-bit per pixel applications, or where the Serial Data width is equal to the Data Bus width, but can be designed to support any number or type of applications utilizing different sizes of bits per pixel, or where the SDW is not equal to the DBW, as will be readily understood by those skilled in the art.

Figure 4A:
FIG. 4A illustrates an example of the update and data sequence for a 16-bit per pixel data type in the graphics display system of the present invention according to a preferred embodiment of the present invention.

FIG. 4 illustrates an example of the update and data sequences for the 8-bit per pixel and 16-bit per pixel data types, according to a preferred embodiment of the present invention. In FIG. 4A, the graphics memory update shown is for a 16-bit per pixel application during a particular RAS cycle, and is using page-mode to write the first 24 application pixels (P00$_{HEX}$–P17$_{HEX}$) of a scan-line (stored at the start of memory row 01F$_{HEX}$). At the falling edge of RAS, the row address is obtained from the address bus (A(8:0.O) =A(8:0.E)=01F$_{HEX}$). At the first falling edge of CAS, the column address applied to each memory device is obtained from the address bus (A(8:0.O)=A(8:0.E)=000$_{HEX}$), providing access to the first 4 pixels (P00$_{HEX}$–P03$_{HEX}$) of the scan-line. At each subsequent falling edge of CAS, the column addresses are obtained from the address bus (A(8:0.O)=A(8:0.E)=001$_{HEX}$ ... 005$_{HEX}$), providing access to the subsequent 20 16-bit pixels (P04$_{HEX}$–P17$_{HEX}$) of the scan-line in 5 subsequent CAS cycles. At each falling edge of CAS, the pixel data on the 64-bit data bus is written to the 8 bytes at each row/column address pair. It should be noted that, for the even column addresses (000$_{HEX}$, 002$_{HEX}$, 004$_{HEX}$), the two bytes of pixel data are ordered identically to that shown in FIG. 2A, with the higher byte of pixel data going to the odd (higher) byte and the lower byte of pixel data going to the even (lower) byte. This will be called the "Normal" byte ordering. For the odd column addresses (001$_{HEX}$, 003$_{HEX}$, 005$_{HEX}$), the two bytes of pixel data are ordered in reverse from that shown in FIG. 2A, with the higher byte of pixel data going to the even (lower) byte and the lower byte of pixel data going to the odd (higher) byte. This will be called the "Reverse" byte ordering.

To update memory fields in Graphics Memory 50 that contain 8-bit application pixels, graphics controller 40 transfers 8 bytes of data over the data bus, one byte being transferred to each of the VRAMs 51–58. During the same clock cycle, graphics controller 40 outputs address signals on the address bus providing two adjacent column addresses simultaneously. (One address consisting of the address signals A(8:1) and the odd address signal A(0.O) provides a column address to the Odd group of VRAMs 51, 53, 55, 57, and a second column address consisting of the address signals A(8:1) and the even address signal (A(0.E) provides a column address to the Even group of VRAMs 52, 54, 56, 58.) This can be seen in FIG. 4B where the graphics memory update shown is for an 8-bit per pixel application during a particular RAS cycle, and is using page-mode to write the next 24 application pixels (P18$_{HEX}$–P2F$_{HEX}$) of the same scan-line (stored at memory row 01F$_{HEX}$). At the falling edge of RAS, the row address is obtained from the address bus (A(8:0.O)=A(8:0.E)=01F$_{HEX}$). At each falling edge of CAS, the column addresses for the even bytes are obtained from the even address signal of the address bus (A(8:0.E) =006,008,00A$_{HEX}$), and the column addresses for the odd bytes are obtained from the odd address signal of the address bus (A(8:0.O)=007,009,00B$_{HEX}$). At the first falling edge of CAS, the even bytes of the Data Bus are used to supply the pixel data for the first four 8-bit application pixels of the scan-line (P18,P19,P1A,P1B$_{HEX}$), associated with column address 006$_{HEX}$ At the same falling edge of CAS (i.e., during the same clock cycle), the odd bytes of the Data Bus are used to supply the pixel data for the next four 8-bit application pixels of the scan-line (P1C,P1D,P1E,P1F$_{HEX}$), associated with column address 007$_{HEX}$. At the second falling edge of CAS, the even bytes of the Data Bus are used to supply the pixel data for the next four 8-bit application pixels of the scan-line (P20,P21,P22,P23$_{HEX}$) associated with column address 008$_{HEX}$. At this second falling edge of CAS (i.e., during the same clock cycle), the odd bytes of the Data Bus are used to supply the pixel data for the next four 8-bit application pixels of the scan-line (P24.P25.P26.P27$_{HEX}$), associated with column address 009$_{HEX}$. At the third falling edge of CAS, the even bytes of the Data Bus are used to supply the pixel data for the next four 8-bit pixels of the scan-line (P28.P29.P2A.P2B$_{HEX}$), associated with column address 00A$_{HEX}$. At this third falling edge of CAS, the odd bytes of the Data Bus are used to supply the pixel data for the next four 8-bit application pixels of the scan-line (P2C, P2D.P2E.P2F$_{HEX}$), associated with column address 00B$_{HEX}$.

Odd bytes at even column addresses of the scan-line are unused and are not updated by the 8-bit accesses. Even bytes at odd column addresses of the scan-line are unused and are not updated by the 8-bit accesses. If marker values are used for the odd bytes at even column addresses and for even bytes at odd column addresses to indicate that the pixel data is of the 8-bits per pixel type, then such markers will have to be preset to the appropriate values for a previous fill operation using high-speed Block or Flash Writes.

Figure 4B:
FIG. 4B illustrates an example of the update and data sequence for an 8-bit per pixel application type in the graphics display system of the present invention according to a preferred embodiment of the present invention.

Graphics Controller 40 provides the pixel data control and byte sequencing, as shown in FIGS. 4A and 4B, at the update side of the Graphics Memory 50, for both 16- and 8-bit pixel data. For the 16-bit application pixels, Graphics Controller 40 changes the byte ordering from Normal to Reverse as appropriate for each given column address. An alternative embodiment would be not to alternate the byte order for 16-bit pixels, but only to alternate the byte order for 8-bit pixels.

Therefore, as the preferred embodiment of the present invention has shown, at each falling edge of CAS, the 64-bit data bus is used to write the eight consecutive 8-bit pixels at two adjacent column addresses. The present invention provides access to the 24 8-bit pixels in 3 CAS cycles, rather than the conventional 6 cycles. Thus, the preferred embodiment of the present invention, while not changing the performance of the 16-bit application, has nearly doubled the performance of the 8-bit application.

Figures 4C, 4D:
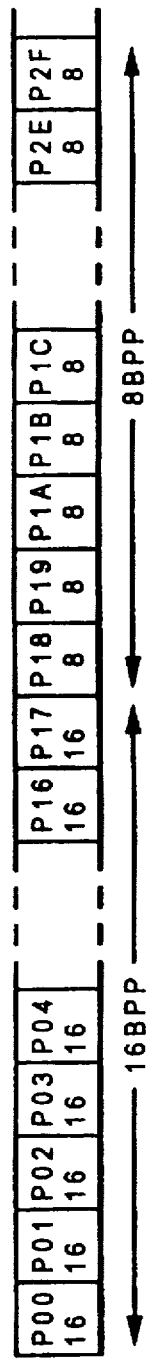
FIG. 4C depicts a diagrammatical representation of the storage of pixel data in graphics memory, and of the serial data output sequence for the example of FIG. 3, according to a preferred embodiment of the present invention.
FIG. 4D depicts the Display Data Sequence output by a Palette DAC for the example of FIG. 3, according to a preferred embodiment of the present invention.

Referring now to FIG. 4C, there is depicted an example graphically showing the storage of pixel data in the graphics memory and the serial data output sequence. Just as in the example described with FIG. 2C, Graphics Memory 50 has been configured for a 16-bit per pixel application, and therefore, the memory field size allocated for the graphics memory is 2 bytes. The first 24 memory fields of the scan-line, stored in Graphics Memory 50 as shown in FIG. 4C, contain 16-bit per pixel application pixels. Thus, the two bytes of each memory field is filled by the two bytes of an application pixel. As previously explained, the byte ordering for each memory field alternates from Normal to Reverse ordering for adjacent columns. The second 24 memory fields of the scan-line, stored in Graphics Memory 50 as shown in FIG. 4C, each contain an 8-bit application pixel, leaving a second byte of each memory field unused. Just as with the 16-bit application pixels, graphics controller 40 has alternated the byte ordering from Normal to Reverse for memory fields in adjacent columns.

In addition to diagrammatically mapping graphics memory, FIG. 4C shows the Serial Data Sequence for the first 48 pixels of the scan-line when it is output on the Serial Data Bus (SD(63:0)). In the example shown, the Serial Data Sequence of pixel data output from Graphics Memory 50 to Palette DAC 60 begins with the data stored at column address 000$_{HEX}$ of the row associated with the scan-line being output from the Graphics Memory 50. Each subsequent cycle presents data from each subsequent column of that row, 001$_{HEX}$, 002$_{HEX}$, 003$_{HEX}$ ... and so on. Because the Serial Data Bus is 64-bits wide, and the configuration is set for N=16 (16-bit pixels), the display data for 4 pixels is output on every cycle of a serial clock. For the first 6 cycles, the 24 16-bit pixels (P00$_{HEX}$–P17$_{HEX}$), written for the 16-bit application, are output on the Serial Data Bus. For the next 6 cycles, the 24 8-bit pixels (P18$_{HEX}$–P2F$_{HEX}$), written for the 8-bit application, are output on the Serial Data Bus. The Palette DAC 60 receives the display data for four pixels in every serial clock cycle from the Serial Data Bus (so called 4:1 Multiplexing), at a rate that is one quarter of the display pixel frequency. The Palette DAC 60 processes the received Serial Data one pixel (16-bits) at a time, in the sequence SD(15:0), SD(31:16), SD(47:32), SD(63:48), converting the 4-wide quarter rate pixel data stream into a 1-wide full rate pixel data stream.

FIG. 4D shows the full rate pixel data stream (the Display Data Sequence) that is processed at the pixel rate of the display and converted to the analog signals used to drive the attached display device. In the example shown, the first 24 pixels (P00$_{HEX}$–P17$_{HEX}$) are understood to be 16-bit pixels (by detecting marker values in the pixel data, for example) and the two bytes of pixel data are processed by the Palette DAC 60 according to the mode and functions specified for such 16-bit pixels. The Palette DAC 60 internally swaps the bytes of the 16-bit pixels derived from odd column addresses in order to match the update byte-swapping used for the odd column addresses. In the example shown, the next 24 pixels (P18$_{HEX}$–P2F$_{HEX}$) are understood to be 8-bit pixels (by detecting marker values in the pixel data, for example) and are processed by the Palette DAC 60 according to the mode and functions specified for such 8-bit pixels. The Palette DAC 60 processes the even (lower) byte of pixel data for each pixel derived from an even column address, and the odd (higher) byte of pixel data for each pixel derived from an odd column address in order to match the byte sequencing used at the time of update. Because the data is for 8-bit pixels, the other bytes of pixel data are ignored by the Palette DAC. Thus, the graphics display system of the present invention can simultaneously present 16bpp applications and 8 bpp applications without penalizing the performance of any 8 bpp application.

Thus, according to the present invention, by varying the sequence of bytes within the transferred pixel data and addressing multiple columns per clock cycle, full memory bandwidth can be provided to all displayed applications irrespective of the number of bits per pixel used. The pattern for the sequencing of bytes within pixel data can be varied spatially within graphics memory, in a simple algorithmic fashion, both horizontally (in the pixel or column dimension) and vertically (in the line or row dimension). The pattern used will depend on the parameters of the graphics display system, on the pixel sizes that are required to be supported, and on the graphics operations that are being enhanced.

Figure 7:
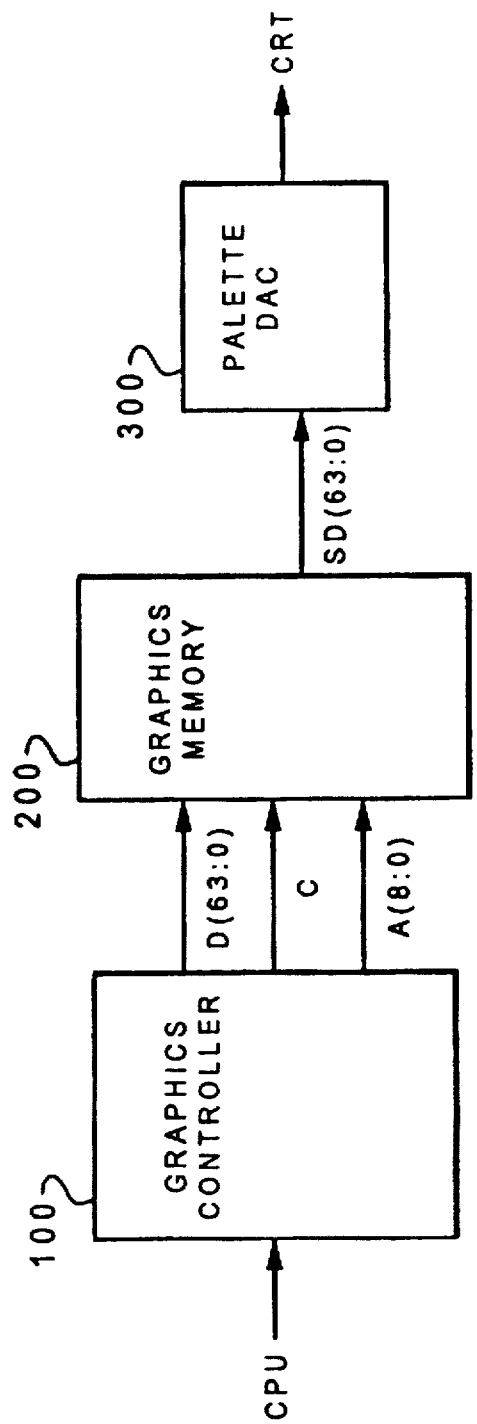
FIG. 7 depicts a schematic block diagram of a graphics display system, according to an alternative preferred embodiment of the present invention.

While a first preferred embodiment of the present invention has been described, a second preferred embodiment of the present invention will now be described with reference to FIG. 7. Graphics controller 100 receives display data from a CPU. Application pixel data is sent out over a 64-bit data bus (D(63:0)) using the update and data sequence for a 16-bit per pixel data type and an 8-bit per pixel data type, as was described herein for the first preferred embodiment and a 9-bit address is sent over the address bus (A(8:0)). In addition, control signal are sent over a control bus (C) from graphics controller 100 to graphics memory 200. The control signal (C) sent by a graphics controller 100 would indicate to graphics memory 200 the application pixel size for a given set of application pixels output on the data bus during a given memory clock cycle. For example, during CAS cycles as depicted in FIG. 4A, the control signal would be set to indicate 16-bit per pixel data, and during CAS cycles as depicted in FIG. 4B, the control signal would be reset to indicate 8-bit per pixel application data.

Graphics memory 200 contains logic means for addressing each byte of data in the set to a memory location, as a function of a received row and column address pair and the application pixel size indication received from the control bus (C). For example, if graphics memory 200 was configured for 16-bit memory fields, and a set of 8-bit application pixels were transferred along with a row and column address pair in a given memory clock cycle, the control signal would indicate that the set contains 8-bit application pixels. Because graphics controller 100 is transferring two columns of application pixels per memory clock cycle (as was described in the first preferred embodiment for FIG. 4B), only even (or alternatively only odd) column addresses are transferred. With an 8-bit application pixel indication on the control bus, graphics memory 200 would store one group of application pixels (for example, the even bytes) in the even column addressed by graphics controller 100, and a second group of application pixels (the odd bytes of pixel data) to the next column in graphics memory (i.e. the column addressed by the transferred address (A(8:0)) plus 1. Graphics memory 200 could then have sorting logic to rearrange the pixel data so that its pixel data is output over the serial data bus (SD(63:0)) either as was described in conjunction with FIG. 2C or as was described in conjunction with FIG. 4C, as will be appreciated by those skilled in the art.

Figures 5, 6:
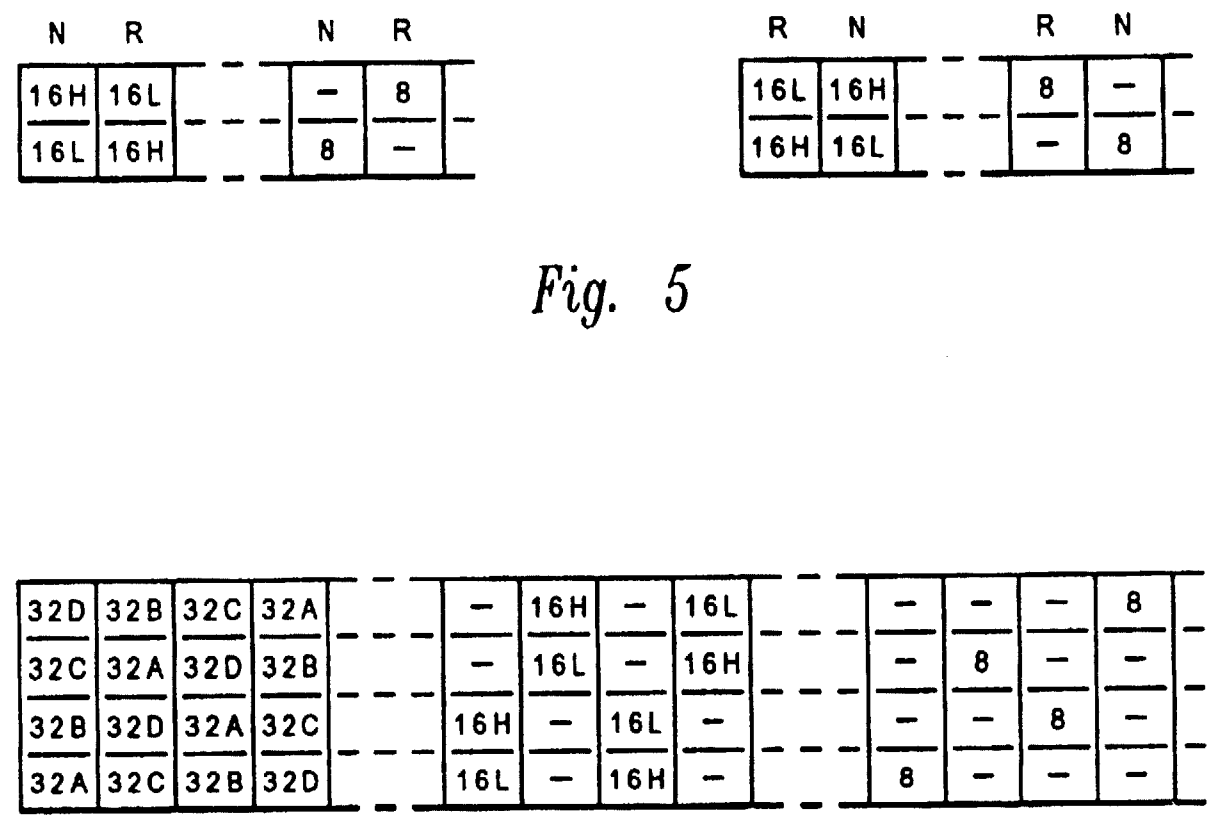

In the example and description above, the preferred embodiment uses an alternating sequence of "Normal" and "Reverse" byte ordering. This sequence could be given the shorthand notation of "NR ...". An equally viable sequence for an alternative embodiment, that could have been used in the above example, would be "RN ...", where the sequence begins with the "Reverse" byte ordering. These alternative sequences are shown diagrammatically in FIG. 5. Either "NR ..." or "RN ..." is applicable to a graphics display system using 16 bpp and 8 bpp applications, with an Update Data bus of the same width as the Serial Data bus (in the case of the example, both were 64-bits). However, if the Update Data bus were twice the width of the Serial Data bus, sequences like "NNRR ..." and "RRNN ..." would have been used. Appropriate sequences of byte ordering will potentially vary with variations in the architecture of the graphics display system and with the requirements, as will be appreciated by those skilled in the art. In addition, as will be appreciated by those skilled in the art, the sequence of byte ordering may also be varied for each display scan line to create a 2-dimensional variation in byte ordering, and potentially to exploit the ability to provide two adjacent row addresses (rather than one) at the falling edge of RAS.

It should be understood that the present invention is not limited to the preferred embodiment particularly shown and described herein above. It will be understood by those skilled in the art that the present invention may be practiced with any number of different application pixel sizes for a given memory field size. For example, the concepts of the present invention may also be extended by considering a graphics display system that is configured for 32-bit pixels (N=32) and that allows 8 bpp, 16 bpp, and 32 bpp applications to be presented simultaneously. Using the A,B,C,D as the notation for the four bytes of a 32-bit pixel, in order of significance with D as most significant, an example of the graphics memory configuration for such a case is shown diagrammatically in FIG. 6.

For a graphics display system that allows its graphics memory to configure for 32-bit per pixel applications, an embodiment of the present invention would have both of the two least significant bits of the memory address, A(1:0), split into Odd/Even pairs as an extension to that shown in FIG. 3, resulting in four extra address signals in addition to the eight higher order address bits. Such addressing will allow up to 4 adjacent column addresses to be accessed in a single CAS cycle by addressing four groups of VRAMS separately. Such a graphics display system with a W-bit Update Data bus width, can access W/32 32-bit pixels, or W/16 16-bit pixels, or W/8 8-bit pixels in a single clock cycle; thus, the graphics display system can simultaneously present 32 bpp, 16 bpp, and 8 bpp applications without penalizing the performance of any 16 bpp or 8 bpp application.

While the invention has been particularly shown and described with reference to a preferred embodiment, it will be understood by those skilled in the art that various changes in form and detail may be made therein without departing from the spirit and scope of the invention.

What is claimed is:

1. A graphics display system for displaying graphic images, comprising:
    a data bus for transferring a set of application pixels, wherein a set consists of W number of blocks of data, and wherein each application pixel is M number of blocks;
    an address bus for transferring memory addresses;
    a graphics controller for outputting pixel data on the data bus at a rate of one set per memory clock cycle and for outputting one or more column addresses on the address bus for each set; and
    a graphics memory configured for a memory field size of N number of blocks such that an application pixel being stored in the graphics memory is allocated N blocks, the graphics memory includes W number of memory devices wherein each memory device receives a different block from a set transferred by the data bus and stores the block at a memory location addressed by a column address received from the address bus;
    wherein the graphics controller outputs, over the address bus to the graphics memory, a different one of N/M number of column addresses to each of N/M groups of memory devices for any given set output on the data bus.

2. A graphics display system for displaying graphic images according to claim 1, further comprising a digital-to-analog converter that receives the application pixels from the graphics memory in a series of memory fields, wherein the digital-to-analog converter processes each memory field as a function of the number of blocks per application pixel contained in that particular memory field.

3. A graphics display system for displaying graphic images according to claim 1, wherein each group has a predetermined position for each of the M blocks of a given application pixel within the allocated memory field, wherein the position is selected as a function of the application pixel size and the memory field size.

4. A graphics display system for displaying graphic images according to claim 1, wherein the address bus comprises a plurality of column address buses.

5. A graphics display system for displaying graphic images according to claim 4, wherein the graphics memory includes two groups of video RAMs, the first group addressed by a first column address bus and the second group being addressed by a second column address bus.

6. A graphics display system for displaying graphic images according to claim 1, wherein a block is a binary byte.

7. A graphics display system for displaying graphic images according to claim 1, wherein a graphics memory device is a video RAM.

8. A graphics display system for displaying graphic images according to claim 1, wherein N is equal to two and M is equal to one.

9. A graphics display system for displaying graphic images according to claim 8, wherein W is equal to eight.

10. A graphics display system for displaying graphic images according to claim 1, wherein N is equal to four and M is equal to one.

11. A graphics display system for displaying graphic images according to claim 1, wherein W is equal to eight.

12. A method of updating graphics memory in a graphics display system through multiple address transferring of pixel data, the method comprising the steps of:

transferring a set of application pixels to a graphics memory at a rate of one set per memory clock cycle, wherein a set comprises W number of blocks of data and an application pixel comprises M number of blocks, and wherein a memory field is the N number of blocks allocated in the graphics memory for each application pixel stored, and further wherein each block belongs to one of N/M groups of blocks;

transferring addressing information to the graphics memory during the same memory clock cycle that the set is transferred; and storing each block of the transferred set in the graphics memory in a memory field indicated by transferred addressing information, wherein each group of blocks is stored at a different one of N/M number of column addresses for any given transferred set.

13. A method of updating graphics memory of a graphics display system through multiple address sequencing of pixel data according to claim 12, wherein the addressing information includes one or more control signals indicating the application pixel size for the transferred set.

14. A method of updating graphics memory of a graphics display system through multiple address sequencing of pixel data according to claim 12, further comprising the step of transferring a memory field at a given column address and row address, the memory field containing an application pixel, to a digital-to-analog converter.

15. A method of updating graphics memory of a graphics display system through multiple address sequencing of pixel data according to claim 14, wherein the digital-to-analog converter processes each memory field as a function of the number of blocks per application pixel contained in that particular memory field.

16. A method of updating graphics memory of a graphics display system through multiple address sequencing of pixel data according to claim 12, further comprising the step of transferring the blocks stored at a given column and row address pair in the graphics memory to a digital-to-analog converter in series.

17. A method of updating graphics memory of a graphics display system through multiple address sequencing of pixel data according to claim 16, further comprising the step of removing blocks from the series of blocks as a function of the application pixel size of the application pixel contained in the memory field addressed by the row and column address pair.

18. A method of updating graphics memory of a graphics display system through multiple address sequencing of pixel data according to claim 12, wherein a block is a binary byte.

19. A method of updating graphics memory of a graphics display system through multiple address sequencing of pixel data according to claim 12, wherein the addressing information includes one or more column addresses.

20. A method of updating graphics memory of a graphics display system through multiple address sequencing of pixel data according to claim 12, wherein the step of storing includes storing in a memory field indicated by the addressing information and a row address.

21. A method of updating graphics memory of a graphics display system through multiple address sequencing of pixel data according to claim 12, wherein N is equal to two and M is equal to one.

22. A method of updating graphics memory of a graphics display system through multiple address sequencing of pixel data according to claim 12, wherein N is equal to four and M is equal to one.

23. A method of updating graphics memory of a graphics display system through multiple address sequencing of pixel data according to claim 12, wherein W is equal to eight.

24. A graphics display system for displaying graphic images, comprising:

means for transferring a set of application pixels to a graphics memory at a rate of one set per memory clock cycle, wherein a set comprises W number of blocks of data and an application pixel comprises M number of blocks, and wherein a memory field is the N number of blocks allocated in the graphics memory for each application pixel stored, and further wherein each block belongs to one of N/M groups of blocks;

means for transferring one or more column addresses to the graphics memory during the same memory clock cycle that the set is transferred, and transferring a row address; and means for storing each block of the transferred set in the graphics memory in a memory field indicated by a transferred row and column address, wherein each group of blocks is stored at a different one of N/M number of column addresses for any given transferred set.

25. A graphics display system for displaying graphic images according to claim 24, further comprising means for transferring a memory field at a given column address and row address, the memory field containing an application pixel, to a digital-to-analog converter.

26. A graphics display system for displaying graphic images according to claim 25, wherein the digital-to-analog converter processes each memory field as a function of the number of blocks per application pixel contained in that particular memory field.

27. A graphics display system for displaying graphic images according to claim 24, further comprising means for transferring the blocks stored at a given column and row address pair in the graphics memory to a digital-to-analog converter in series.

28. A graphics display system for displaying graphic images according to claim 27, further comprising means for removing blocks from the series of blocks as a function of the application pixel size of the application pixel contained in the memory field addressed by the row and column address pair.

29. A graphics display system for displaying graphic images according to claim 24, wherein a block is a binary byte.

30. A graphics display system for displaying graphic images according to claim 24, wherein N is equal to two and M is equal to one.

31. A graphics display system for displaying graphic images according to claim 24, wherein N is equal to four and M is equal to two.

32. A graphics display system for displaying graphic images according to claim 24, wherein N is equal to four and M is equal to one.

33. A graphics display system for displaying graphic images according to claim 32, wherein W is equal to eight.

34. A graphics display system for displaying graphic images, comprising:

a data bus for transferring a set of application pixels, wherein a set consists of W number of blocks of data, and wherein each application pixel is M number of blocks;

an address bus for transferring memory addresses;

a graphics controller for outputting pixel data on the data bus at a rate of one set per memory clock cycle and for outputting one or more column addresses on the address bus for each set; and a graphics memory configured for a memory field size of N number of blocks such that an application pixel being stored in the graphics memory is allocated N blocks in the graphics memory, the graphics memory stores each block of a transferred set at a memory location addressed by a row and column address pair received from the address bus;

wherein each of the W blocks belongs to one of N/M groups of blocks, and further wherein the graphics controller outputs, over the address bus to the graphics memory, a different one of N/M number of column addresses to provide a column address for storing each group of blocks, for any given set output on the data bus.

35. A graphics display system for displaying graphic images according to claim 34, further comprising a digital-to-analog converter that receives the application pixels from the graphics memory in as memory fields, wherein the digital-to-analog converter processes each memory field as a function of the number of blocks per application pixel contained in that particular memory field.

36. A graphics display system for displaying graphic images according to claim 34, wherein each group has a predetermined position for each of the M blocks of a given application pixel within the allocated memory field, wherein the position is selected as a function of the application pixel size and the memory field size.

37. A graphics display system for displaying graphic images according to claim 34, wherein the address bus comprises a plurality of column address buses.

38. A graphics display system for displaying graphic images according to claim 34, wherein the graphics memory includes two groups of video RAMs, the first group addressed by a first column address bus and the second group being addressed by a second column address bus.

39. A graphics display system for displaying graphic images according to claim 34, wherein a block is a binary byte.

40. A graphics display system for displaying graphic images according to claim 34, wherein N is equal to two and M is equal to one.

41. A graphics display system for displaying graphic images according to claim 40, wherein W is equal to eight.

42. A graphics display system for displaying graphic images according to claim 34, wherein N is equal to four and M is equal to two.

43. A graphics display system for displaying graphic images according to claim 34, wherein N is equal to four and M is equal to one.

44. A graphics display system for displaying graphic images according to claim 34, wherein W is equal to eight.

* * * * *